United States Patent [19]

Kent et al.

[11] Patent Number: 4,672,753
[45] Date of Patent: Jun. 16, 1987

[54] ROTATION SENSOR

[75] Inventors: William H. Kent; Robert C. Steel, both of Westford, Mass.

[73] Assignee: Gas Research Institute, Chicago, Ill.

[21] Appl. No.: 864,672

[22] Filed: May 19, 1986

[51] Int. Cl.$^4$ ............................................... G01C 9/06
[52] U.S. Cl. ....................................................... 33/366
[58] Field of Search ................. 33/366, 377, 378, 365, 33/312; 200/61.47; 340/967, 975; 324/65 D

[56] References Cited

U.S. PATENT DOCUMENTS 2,893,134  7/1959  Shea et al. ............................. 33/366
3,604,275  9/1971  Fox ..................................... 33/377 X

FOREIGN PATENT DOCUMENTS 2399642  4/1979  France ................................. 33/366
 159356  6/1957  Sweden ................................ 33/366

Primary Examiner—Harry N. Haroian
Attorney, Agent, or Firm—Neal J. Mosely

[57] ABSTRACT

A toroidal liquid filled sensor measures rotation with respect to vertical in any plane normal to the earth's surface and comprises a sealed, non-conductive, hollow toroidal housing of square or rectangular cross section with an interior circular cavity or channel of like cross section. A discontinuous resistive strip circles the interior surface of the channel outer wall and a continuous conductive strip or collector circles the exterior surface of the channel inner wall. Electrical contacts are connected to each end of the resistive strip and a third contact is connected to the collector. The channel contains a quantity of dielectric or resistive fluid which has total volume less than a 30° sector of the channel. Electrical damping (R-C time constant) is achieved by balancing the capacitance and resistance parameters. A single sensor has a linear range greater than 270°. The combination of two sensors allows measurement of full 360° of rotation and use of a sensor array allows measurement in 2 degrees of freedom for measuring pitch and roll. The sensor system is suitable for use in many applications and in particular may be used as part of a system for horizontal, guided boring in the earth.

28 Claims, 8 Drawing Figures

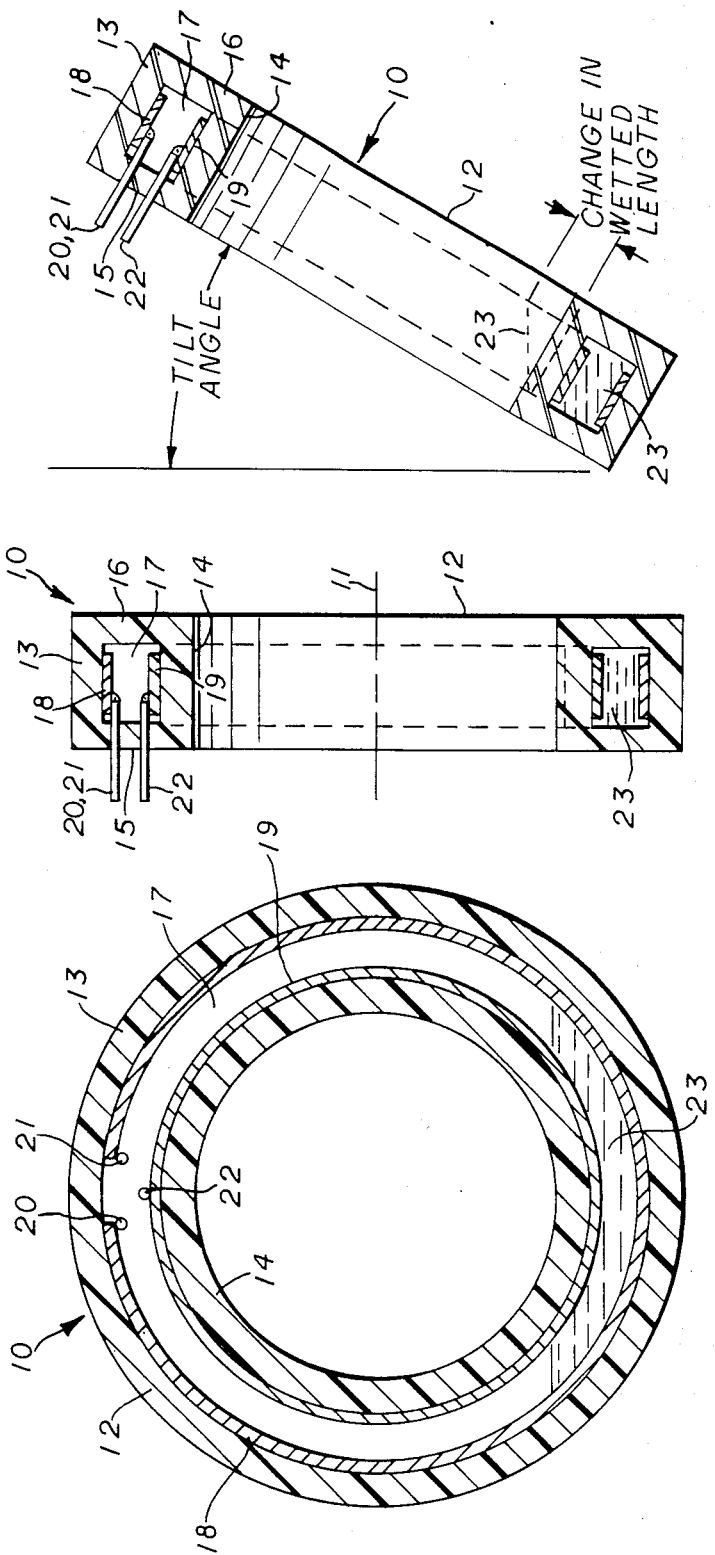

ROTATION SENSOR

BACKGROUND OF THE INVENTION

1. Field of the Invention

This invention relates generally to electric, liquid-filled tilt sensor devices, and more particularly to a rotation sensor which measures rotation about the axis normal to the circumferential plane of the sensor.

2. Brief Description of the Prior Art

Liquid filled tilt sensor and gravimeter devices are known in the art. There are several patents which various tilt sensor and gravimeter devices, none of which utilize electrical damping.

Cantarella et al, U.S. Pat. Nos. 4,167,818 and 4,244,117 discloses a gravity-sensing potentiometer mounted on a bar placed against a surface to be gauged to determine the degree to which the surface is inclined with respect to the horizontal and vertical axis to provide a digital or analog readout.

Thele, U.S. Pat. No. 4,121,347 discloses an apparatus for sensing and indicating the orientation of an object comprising two tilt sensing devices whose resistances vary responsive to the tilt of the devices, one of the sensing devices being mounted rotatably and connected by a bevel gear to the object being measured.

Shawhan, U.S. Pat. No. 3,906,471 discloses a capacitive type inclinometer which rotates with a portion of a drill pipe. A transmitter, located downhole near the inclinometer, converts the capacity changes of the inclinometer into a rectangular wave to be transmitted to the surface and read out as degrees.

Scopacasa, U.S. Pat. No. 3,786,472 discloses a toroid chamber half filled with mercury and having pairs of electrodes embedded in and spaced around the periphery of the chamber to correspond to the points of liquid contact when the chamber is inclined to predetermined angles.

Holderer, U.S. Pat. No. 3,164,023 discloses a motion sensing transducer comprising a toroid tubular member having a plurality of electrodes arranged to create an unbalanced condition in an electrical circuit repsonsive to deviation of position or movement of the device. The toroid tube is filled with a liquid and displaceable mass such as mercury which have different resistivity and are in contact with various electrodes in the normal position. Since the resistance of the liquid is greater than that of the mercury, the displacement of the mercury as the device is deviated from normal will increase or decrease the resistance between the electrodes.

Chaney, U.S. Pat. No. 3,984,918 discloses an inclinometer which employs a ferrofluid as a movable core of a differential transformer.

Lees, U.S. Pat. No. 2,983,149 discloses an angular accelerometer which is used to measure changes in angular velocity.

The present invention differs from the prior art in general and these patents in particular by providing a toroidal liquid filled sensor which measures rotation with respect to vertical in any plane normal to the earth's surface and comprises a sealed, non-conductive, hollow toroidal housing of square or rectangular cross section with an interior circular cavity or channel of like cross section. A discontinuous resistive strip circles the interior surface of the channel outer wall and a continuous conductive strip or collector circles the exterior surface of the channel inner wall. Electrical contacts are connected to each end of the resistive strip and a third contact is connected to the collector. The channel contains a quantity of dielectric fluid which has total volume less than a 30° sector of the channel. Electrical damping (R-C time constant) is achieved by balancing the capacitance and resistance parameters. A single sensor has a linear range greater than 270°. The combination of two sensors allows measurement of full 360° of rotation and use of a sensor array allows measurement in 2 degrees of freedom for measuring pitch and roll.

SUMMARY OF THE INVENTION

It is therefore an object of the present invention to provide a rotation sensor which will efficiently measure rotation with respect to vertical in any plane normal to the earth's surface including pitch and roll.

It is another object of this invention to provide a rotation sensor whose electrical conductivity is linear over a wide angular range up to 270° and may be used in pairs to obtain a full range of 360°.

Another object of this invention is to provide a rotation sensor having an interior channel containing a discontinuous resistive member, a continuous conductive member, and a quantity of dielectric fluid which has total volume less than a 30° sector of the open channel.

Another object of this invention is to provide a rotation sensor which utilizes a resistive-capacitive electrical damping function to reduce detracting small amplitude movements of the sensor when intrepreting the reading.

A further object of this invention is to provide a rotation sensor which is simple in design, economical to manufacture, and is rugged and durable in use.

Other objects of the invention will become apparent from time to time throughout the specification and claims as hereinafter related.

The above noted objects and other objects of the invention are accomplished by an electronic liquid filled toroidal rotation sensor having an interior channel containing a discontinuous resistive member, a continuous conductive member, and a quantity of dielectric fluid which has total volume less than a 30° sector of the open channel. The electrical conductivity of a single sensor is linear over a wide angular range up to 270° and when used in pairs provides a full range of 360°. Resistive-capacitive electrical damping is used to reduce detracting small amplitude movements of the sensor when interpreting the reading.

BRIEF DESCRIPTION OF THE DRAWINGS

FIG. 1 is a transverse cross section view of the rotation sensor in accordance with the present invention.

FIG. 2 is a longitudinal cross section of the rotation sensor taken along lines 2—2 of FIG. 1.

FIG. 4 is a longitudinal cross section of the rotation sensor illustrating the reduced tilt sensitivity of the sensor due to a small change in wetted length on the resistive and collector strips.

DESCRIPTION OF THE PREFERRED EMBODIMENT

Figure 3:
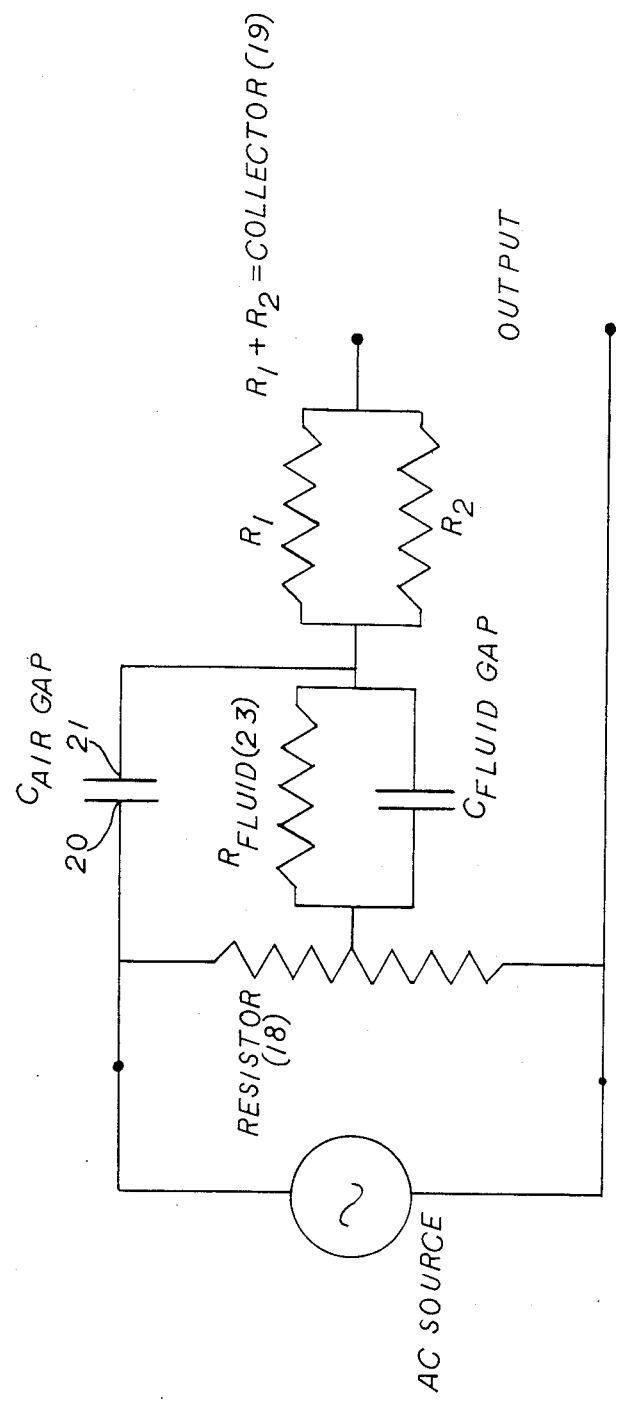
FIG. 3 is a schematic electrical diagram illustrating an electrical circuit containing the sensor of FIGS. 1 and 2.

Referring to the drawings by numerals of reference, there is shown in FIGS. 1 and 2, a preferred rotation sensor 10 for use in measuring rotation about the axis 11 normal to the circumferential plane of the sensor. The sensor 10 operates as a low bandwidth accelerometer for forces normal to the measurement axis and as such is ideally suited for application as a gravimeter or tilt sensor.

The rotation sensor 10 comprises a sealed hollow toroidal housing 12 of square or rectangular cross section having a cylindrical outer wall 13, a cylindrical inner wall 14 concentric therewith, a front wall 15, and back wall 16 defining an interior annular cavity or channel 17 of square or rectangular cross section. The preferred sensor housing 12 is formed of electrically non-conductive and substantially non-porous material, such as acrylic or polycarbonate plastic.

An electrically resistive pattern, coating or strip 18 is supported within the channel 17 on the inner surface of the outer wall 13. The strip 18 is discontinuous at some point along its length forming a gap between its ends. The preferred material for the resistive pattern or strip 18 is one having good surface contact properties and uniform electrical properties along its length and cross section, such as a resistive epoxy or resistive/conductive polymer; the later materials have proven to have better bulk properties and lower surface contact resistance. Photo-lithographically determined resistive elements, such as employed in the semi-conductor industry, are also suitable.

Figure 8:
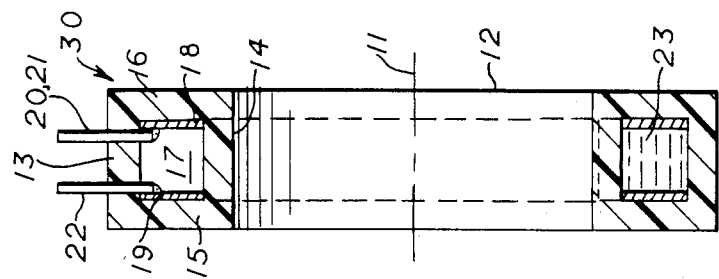
FIG. 8 is a sectional view similar to FIG. 2 of an alternate embodiment of the sensor.

A continuous conductive pattern, coating or strip 19 is secured within the channel 17 on the surface of the inner wall 14. The material used for the conductive strip 19 (hereinafter called the collector 19) is a much better conductor than the resistive material; a conductivity ratio (collector to resistor) of greater than 100 is preferred. Sensors have been built which employ the same material for collector and resistor but with a ratio of 400 in conductivity. Using the same material simplifies manufacture as well as physical characterization of the device. In the embodiment of FIG. 8, the conductive-resistive strips 18 and 19 are on the side walls of the channel 17.

Electrical contacts 20 and 21 are connected to each end of the resistive strip 18 at the point of discontinuity, and a third contact 22 is connected to the collector 19. The contacts 20, 21 and 22 pass through apertures in the housing front wall 15 which are fluid sealed by conventional means, such as sealing with epoxy or potting material. The contacts 20, 21, and 22 connected to the collector 19 and resistor 18 are provided for electrical connection to measurement equipment at a remote location.

The interior channel 17 contains a quantity of dielectric fluid 23 which has total volume less than a 30° sector of the open channel. The choice of fluid may be selectively tailored for both physical and electrical properties. The range of suitable fluid materials is broad; non-conductive fluids include distilled water and many organic solvents. Other resistive fluids include tap water, saline solutions (organic and inorganic), some organic solvents (alcohols), and coloidal suspensions of conductive/resistive solids. Sensors have been demonstrated using all of these fluid types.

Electrical damping (R-C time constant) is achieved by balancing the capacitance and resistance parameters. The Resistance-Capacitance constant is a time constant; equal in seconds to the resistance value in ohms multiplied by the capacitance value in farads. This would be useful for simple display systems such as a digital ohm meter where ambiguity in the last digit of the display and small amplitude movements of the sensor would be a detractor when interpreting the reading.

The physical properties of the fluid 23 are equally important as its electrical properties. Phase transistion temperatures, wetting properties, viscosity, and surface tension all affect the mechanics of sensor behavior and are parameters which may be tuned for a specific application or traded off against electrical properties. For example, damping (R-C time constant) may be achieved through the electrical properties of through selecting the viscosity of the fluid. An important physical property of the fluid is that it be non-destructive of the sensor; when plastics are employed for the housing, collector, and resistor many solvents and most acids have short and long term affects on sensor functionality.

OPERATION

The measurement of rotation is based the principle that when an alternating current (AC) source signal is applied to the sensor the measured signal varies linearly with angular displacement about the normal axis. Theoretically, the sensor operates in the manner of a potentiometer, or variable resistor, with the fluid 23 acting as the wiper arm, the collector strip 19 as the wiper arm connection, and the resistive strip 18 as the resistor element of the potentiometer. As the sensor 10 is rotated in the vertical plane the fluid 23 settles to the lowest point of the open channel 17 and the resistance from the collector 19 to the contacts 21, 21 at either end of the resistive strip 18 varies accordingly. If the strip 18 is uniform in cross-section and resistivity along its length then the sensor will be linear. The dielectric properties of the fluid 23 assist in damping the measurements of the fluid movement as described below.

FIG. 3 illustrates schematically, the electrical behavior of the sensor in a quiescent state. The distributed capacitance and resistance of the strips 18, 19 and the dielectric fluid 23 contribute significantly to the behavior of the sensor. Utilization of the capacitive coupling between the collector strip 19 and the resistive strip 18 is the key to the performance of the sensor.

Using only the resistive properties of the fluid (i.e, a DC reading only) results in a sensor which has a long settling time constant; this is due to R-C (restistance-capacitance) charging and physical settling of the fluid. Dielectric coupling causes the sensor to be less sensitive to physical settling of the fluid because the parallel capacitance of the wetted and non-wetted regions is relatively constant. In other words, the average dielectric constant between the strip over the whole length of the strips (360°) is unaffected by fluid settling since the volume of dielectric is constant and the percent of fluid is constant.

The sensor 10 is relatively insensitive to off axis tilt (the plane of the sensor toroid is not vertical) provided that the open channel 17 dimension perpendicular to the plane of the toroid is small compared to the diameter of the open channel (FIG. 4). The change in wetted length on the resistive and collector strips is small in relation to the diameter of the open channel. The limiting factor for this method of reducing tilt sensitivity is capillary action of the fluid 23 when the channel is too small in either cross-sectional dimension; in this case the physical settling time constant becomes long and the reading is skewed in the direction from which the sensor was last rotated.

Figure 5:
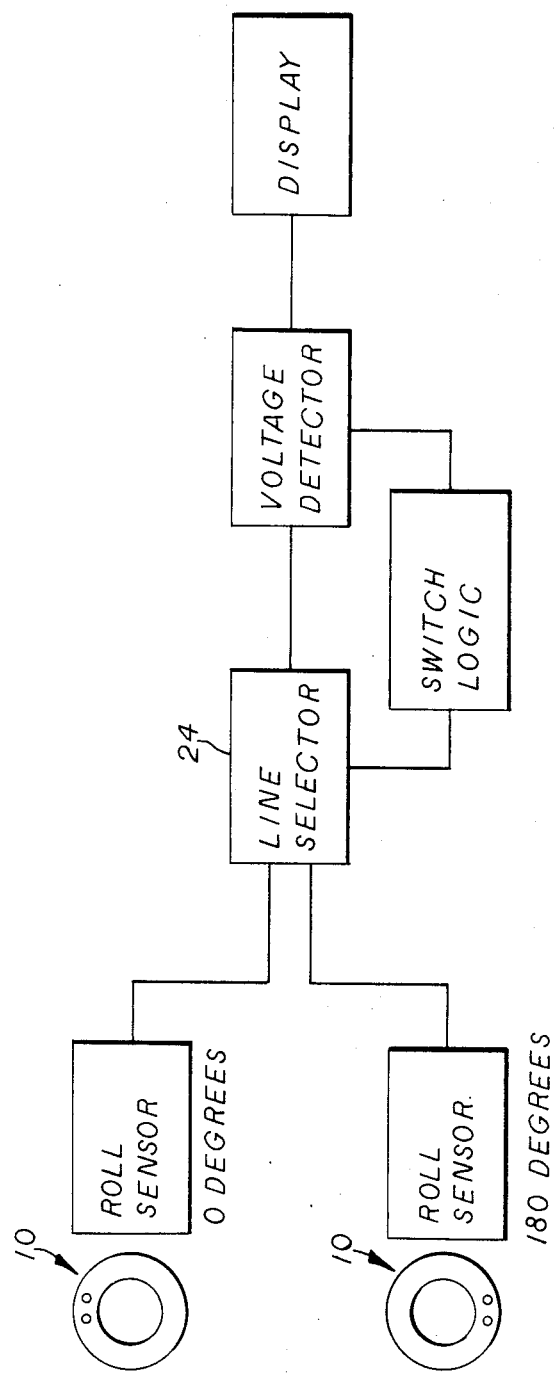
FIG. 5 is a schematic illustration of two sensors paired in a system to obtain a full 360° reading.
Figure 6:
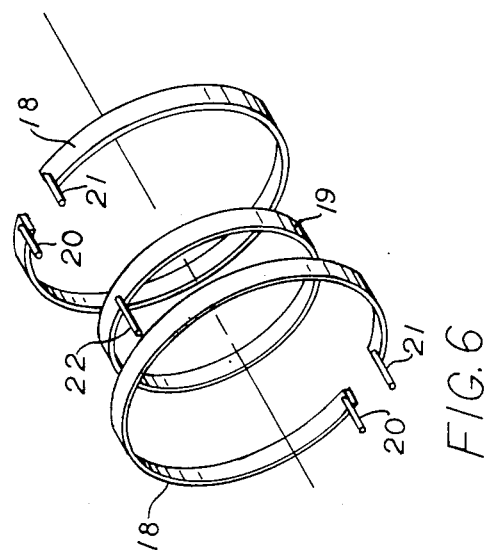
FIG. 6 is a schematic representation of a modified rotation sensor having one collector and two resistors in the same open channel with their contacts 180° apart.

As previously stated, a single rotation sensor has a measurement range somewhat greater than 270°. It will not read a full 360° because of the dead zone associated with the physical length of the fluid in the open channel as it traverses the contact region of the resistive strip 18. In a typical system application this is overcome by deploying 2 sensors with the contact regions being physically offset by 180° as represented in FIG. 5. A single sensor which has one collector and two resistors in the same open channel but with their contacts 180° apart may also be used (FIG. 6). Selection of the correct sensor or correct strip is achieved by connecting the output from each sensor 10 through a line selector 24 to simple electronic readout circuit as shown schematically in FIG. 5.

Figure 7:
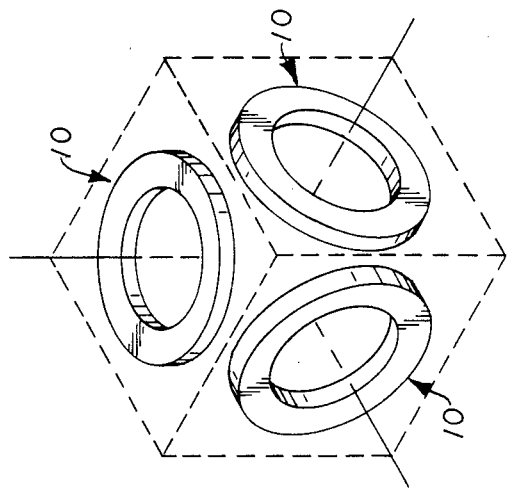
FIG. 7 is a schematic illustration of a set of rotation sensors positioned for measurement of pitch and roll.

The same concept may be employed to produce a sensor which measures rotation in 2 degrees of freedom: pitch and roll. The roll measurement is achieved via a sensor pair as described above. The pitch measurement (pitch is rotation in any plane normal to the plane of the roll sensor) is achieved using 2 sensor pairs which are mutually orthogonal with themselves and the roll sensor pair. This is schematically illustrated in FIG. 7 as a cube with the sensor pairs mounted on any three faces having a common corner. In this method the roll sensor is used to select the pitch sensor pair which will read correctly; a pitch sensor whose plane is parallel or nearly parallel to the surface of the earth will not read or will read incorrectly. Because the sensor can be constructed to be insensitive to tilt, as described above, it is possible to used only 2 sensor pairs for pitch. In this case each pitch sensor pair must read accurately over a range which is plus or minus 45° from the roll angle at which the plane of the pitch sensor is vertical.

The sensor system of the present invention may be readily be adapted for use as part of a simple, low cost guidance system for use in boring horizontal and vertical holes in the earth, as part of a 2 dimensional leveling system for stationary objects (machine tool-beds, etc.), or as part of a trim adjustment system for a aircraft and submersibles vehicles.

While this invention has been described fully and completely with special emphasis upon a preferred embodiment, it should be understood that within the scope of the appended claims the invention may be practiced otherwise than as specifically described herein.

We claim:

1. An inclinometer or attitude sensor, adapted to be connected to a movable object to indicate and measure pitch and roll, comprising
    a hollow toroidal body of non-porous, electrically-nonconductive material having an interior continuous open channel with distinct wall portions,
    a resistor positioned on one wall of said open channel beginning at one point on said wall and extending along said wall and ending at a point spaced from said one point,
    a collector comprising a conductor positioned on and extending completely around another wall of said open channel and spaced from said resistor,
    a pair of electrical contacts on the ends of said resistor and extending outside said body,
    an electrical contact connected to said collector and extending outside said body, and
    a quantity of fluid, having both resistive and dielectric properties, positioned in said open channel and occupying a volume less than about a 30° sector of said channel.

2. A sensor according to claim 1 in which
    said open channel is of square or rectangular cross section, and
    said resistor and collector are positioned on opposite interior walls of said channel.

3. A sensor according to claim 2 in which
    said resistor and said collector each comprises a layer, coating or strip of electrically conductive material.

4. A sensor according to claim 1 in which
    said open channel is of square or rectangular cross section, and
    said resistor and collector are positioned on the outer and inner interior walls of said channel.

5. A sensor according to claim 1 in which
    said open channel is of square or rectangular cross section, and
    said resistor and collector are positioned on the opposing interior side walls of said channel.

6. A sensor according to claim 1 in which
    said open channel is of square or rectangular cross section,
    said resistor and collector are positioned on the outer and inner interior walls of said channel, and
    said resistor and said collector each comprises a layer, coating or strip of electrically conductive material.

7. A sensor according to claim 1 in which
    said hollow toroidal body is of molded plastic.

8. A sensor according to claim 1 in which
    said hollow toroidal body is of molded acrylic or polycarbonate plastic.

9. A sensor according to claim 1 in which
    said resistor is of a resistive-conductive epoxy resin or a resistive-conductive polymer.

10. A sensor according to claim 1 in which
    said collector is of a resistive-conductive epoxy resin or a resistive-conductive polymer.

11. A sensor according to claim 1 in which
    said resistor and said collector are each of conductive epoxy resin or a resistive-conductive polymer.

12. A sensor according to claim 1 in which
    said resistor is applied photolithographically.

13. A sensor according to claim 1 in which
    said collector is applied photolithographically.

14. A sensor according to claim 1 having
    a single collector and a pair of resistors spaced therefrom, and
    one or said resistors having its beginning and end spaced 180° from the beginning and end of the other resistor.

15. A system for detecting pitch and roll of an object comprising
    an inclinometer or attitude sensor connected to said movable object to indicate and measure pitch and roll thereof,
    a source of alternating current connected to said sensor,
    electrical indicating means connected to said sensor to register output therefrom in indicia of pitch and roll,
    said sensor comprising a hollow toroidal body of non-porous, electrically-non-conductive material having an interior continuous open channel with distinct wall portions, a resistor positioned on one wall of said open channel beginning at one point on said wall and extending along said wall and ending at a point spaced from said one point, a collector comprising a conductor positioned on and extending completely around another wall of said open channel and spaced from said resistor, a pair of electrical contacts on the ends of said resistor and extending outside said body, an electrical contact connected to said collector and extending outside said body, and a quantity of fluid, having both resistive and dielectric properties, positioned in said open channel and occupying a volume less than about a 30° sector of said channel.

16. A system according to claim 15 in which
said open channel is of square or rectangular cross section, and
said resistor and collector are positioned on opposite interior walls of said channel.

17. A system according to claim 16 in which
said resistor and said collector each comprises a layer, coating or strip of electrically conductive material.

18. A system according to claim 15 in which
said open channel is of square or rectangular cross section, and
said resistor and collector are positioned on the outer and inner interior walls of said channel.

19. A system according to claim 15 in which
said open channel is of square or rectangular cross section, and
said resistor and collector are positioned on the opposing interior side walls of said channel.

20. A system according to claim 15 in which
said open channel is of square or rectangular cross section,
said resistor and collector are positioned on the outer and inner interior walls of said channel, and
said resistor and said collector each comprises a layer, coating or strip of electrically conductive material.

21. A system according to claim 15 in which
said hollow toroidal body is of molded plastic.

22. A system according to claim 15 in which
said hollow toroidal body is of molded acrylic or polycarbonate plastic.

23. A system according to claim 15 in which
said resistor is of a resistive-conductive epoxy resin or a resistive-conductive polymer.

24. A system according to claim 15 in which
said collector is of a resistive-conductive epoxy resin or a resistive-conductive polymer.

25. A system according to claim 15 in which
said resistor and said collector are each of conductive epoxy resin or a resistive-conductive polymer.

26. A system according to claim 15 in which
said resistor is applied photolithographically.

27. A system according to claim 15 in which
said collector is applied photolithographically.

28. A system according to claim 15 having
a single collector and a pair of resistors spaced therefrom, and
one or said resistors having its beginning and end spaced 180° from the beginning and end of the other resistor.

* * * * *